UNITED STATES PATENT OFFICE.

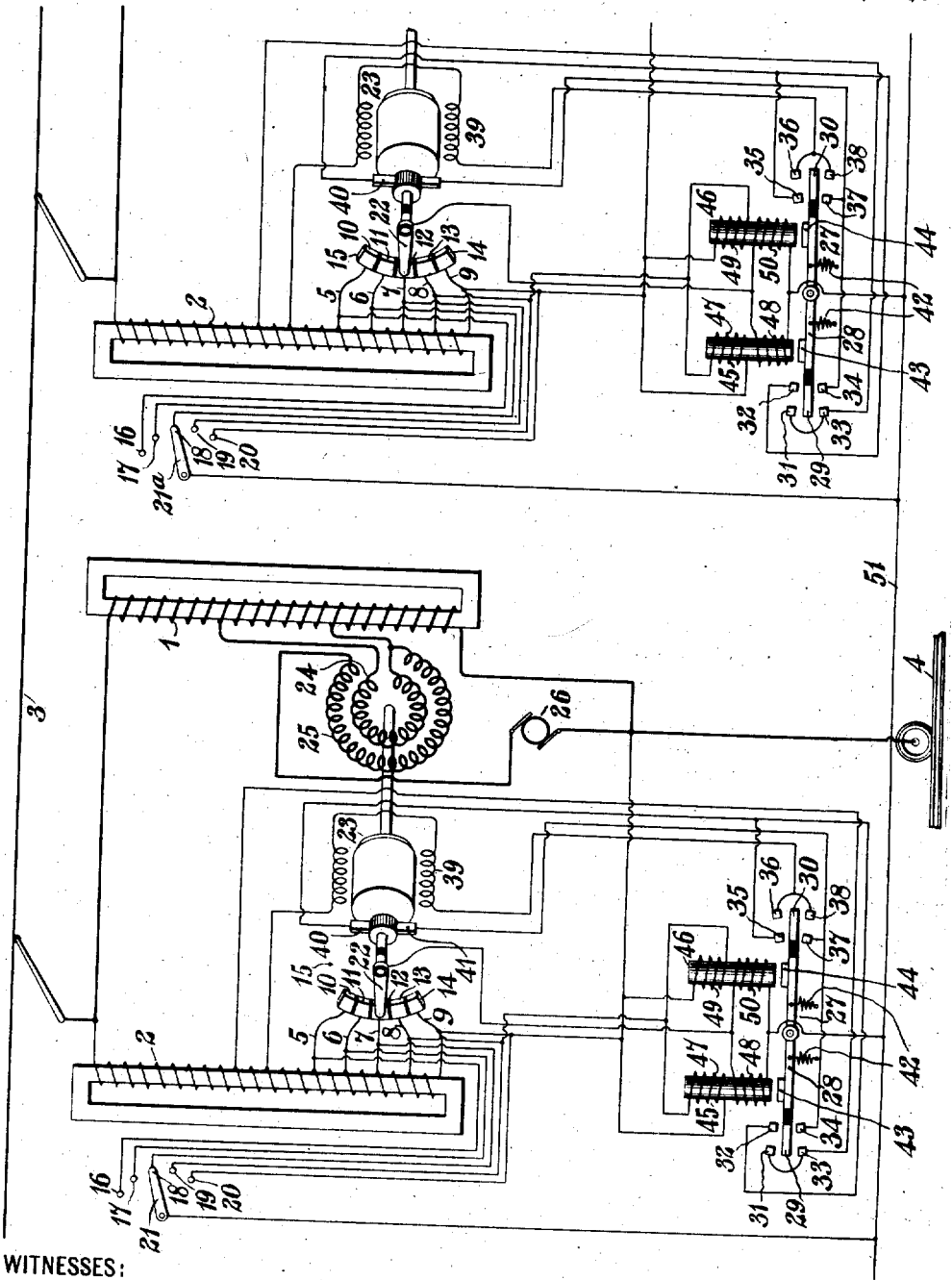

RAY P. JACKSON, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

No. 903,193.   Specification of Letters Patent.   Patented Nov. 10, 1908.

Application filed May 8, 1905, Serial No. 259,385. Renewed January 20, 1906. Serial No. 297,041.

*To all whom it may concern:*

Be it known that I, RAY P. JACKSON, a citizen of the United States, and a resident of Wilkinsburg, in the county of Allegheny and State of Pennsylvania, have invented a new and useful Improvement in Systems of Control, of which the following is a specification.

My invention relates to electrical systems of control, and particularly to such systems as are adapted to govern accurately the movements of mechanisms.

The object of my invention is to provide an improved system of the character and for the purpose indicated.

The single figure of the accompanying drawing illustrates, diagrammatically, a system of control embodying my invention.

A main transformer winding 1 and an auxiliary transformer winding 2 derive energy from a trolley conductor 3 and a track rail 4, the transformer winding 2 being subdivided by means of leads 5, 6, 7, 8 and 9 that are connected, respectively, to contact terminals 10, 11, 12, 13 and 14 of a switch device 15 and also to contact terminals 16, 17, 18, 19 and 20 with which a master switch arm 21 is adapted to engage. Switch arm 22 of the device 15 is operated by means of a motor 23, which, as here shown, derives its energy from the transformer winding 2 and is employed to adjust the inductive relations of windings 24 and 25 of a voltage regulator which may be, in general construction, substantially like that set forth in the subject-matter of Patent No. 740,147, granted September 29, 1903, to the Westinghouse Electric & Manufacturing Company, as assignee of B. G. Lamme, or it may be of any other suitable construction.

The voltage regulator may be employed to adjust the voltages supplied to any translating device, such as a motor 26, and the circuits of the primary and secondary windings may be connected and arranged, with respect to the transformer winding 1, as set forth in the subject-matter of Patent No. 765,185, granted July 19, 1904, to the Westinghouse Electric & Manufacturing Company, as assignee of B. G. Lamme.

The motor 23 may serve to operate any suitable device or mechanism, other than a voltage regulator, the movements of which it is desired to govern accurately, a voltage regulator being shown merely for the purpose of illustrating a useful application of my invention.

The circuits of the motor 23 are governed by means of a switch device 27, which, as here shown, comprises a walking-beam 28 having conducting sections 29 and 30 at its respective ends that are adapted to engage stationary contact terminals 31 to 38, inclusive, which are properly connected with the terminals of the field magnet winding 39 and brushes 40 and 41. The walking-beam is normally maintained in a middle position by means of springs 42, and to it are attached magnetizable armatures 43 and 44 for electro-magnets 45 and 46, respectively, that are provided, as shown, with windings 47, 48, 49 and 50. The windings 47 and 49 are connected in parallel between leads 8 and 9 from the transformer winding 2 and the windings 48 and 50 are connected in parallel between switch arms 21 and 22.

In the drawing, the switch arms 21 and 22 are shown in engagement with the contact terminals 18 and 12, respectively, which are connected with the same point in the transformer winding 2, these being assumed as the "off" positions, under which conditions no difference of potential exists between the terminals of the windings 48 and 50. The windings 47 and 49 are energized continuously by reason of their permanent connection between leads 8 and 9, but the walking-beam 28 is maintained in a middle position because the pulls exerted by the magnets 45 and 46 upon their respective armatures 43 and 44 are balanced.

If the switch arm 21 is moved into engagement with contact terminal 19, a voltage is impressed upon the windings 48 and 50 that is equal to the difference of potential between leads 7 and 8, and the resulting magnetic pull exerted by the winding 48 is added to that exerted by the winding 47, while the magnetizing forces exerted by the windings 49 and 50 become opposed. The magnetic pulls exerted upon the armatures 43 and 44 now no longer balance and the walking-beam 28 is moved so as to bring conducting sections 29 and 30 into engagement with their corresponding contact terminals 31, 32, 37 and 38. The circuits are now so established that the motor 23 is caused to operate in a proper direction to ultimately bring the switch arm 22 into engagement with contact terminal 13, when the windings 47 and 49 become deënergized and the walking-beam 28 again returns to its central position, thereby interrupting the motor circuits.

If the master switch arm 21 is moved into engagement with contact terminal 17, the magnetizing forces of the windings 47 and 48 oppose each other, while the magnetizing forces of the windings 49 and 50 supplement each other and the resulting movement of the walking-beam 28 effects engagement of the conducting sections 29 and 30 with their corresponding contact terminals 33, 34, 35 and 36. The circuits of the motor 23 are then so established as to cause rotation in the proper direction to bring the switch arm 22 into engagement with contact terminal 11, the walking-beam 28 again returning to its central position after such engagement. If the master switch arm 21 is moved into engagement with contact terminal 16, the motor will continue in operation until switch arm 22 engages contact terminal 10, and if it is brought into engagement with contact terminal 20, the motor will rotate in the opposite direction until switch arm 22 is brought into engagement with contact terminal 14. Thus it is seen that by accurately controlling the operation of the motor 23, the relative positions of the windings 24 and 25 of the voltage regulator may be altered at will and in accordance with the variations in position of the master switch arm 21.

I have illustrated two sets of the controlling devices that may be located on separate cars of a train and both may be controlled by either of the master switch arms 21 and 21ª, but it is not my intention to limit the number of devices which may be controlled by means of a single master switch. It is to be observed that it is necessary to employ only a single conductor 51 between the sets of controlling devices or between cars.

Any desired number of contact terminals may be employed in the switch devices and the arrangement of the connections of the transformer winding may be altered to suit almost any desired conditions. A two-winding transformer may be employed instead of an auto-transformer and the motor 23 may derive its energy from any suitable source the system may be further modified in many other than the transformer winding 2, and respects without departing from my invention.

I claim as my invention:

1. The combination with a motor, a mechanism operated thereby, a transformer, a master controlling switch and a switch operated by the motor, corresponding contact terminals of both switches being connected to points in the transformer winding, of an electro-magnetic controlling switch for the motor having windings the circuits of which are continuously established, and windings the circuits of which are governed by the aforesaid switches.

2. The combination with a motor, a mechanism operated thereby, a transformer, a master controlling switch and a switch operated by the motor, corresponding contact terminals of both switches being connected to points in the transformer winding, of an electro-magnetic controlling switch for the motor having windings the magnetic pulls exerted by which are normally balanced and windings which cause unbalancing of the pulls exertd by the other windings.

3. The combination with a motor, a mechanism operated thereby, a transformer, a master controlling switch and a switch operated by the motor, corresponding contact terminals of both switches being connected to points in the transformer winding, of an electro-magnetic controlling switch for the motor having continuously energized windings the magnetic pulls exerted by which are normally balanced and windings which cause unbalancing of the pulls exerted by the other windings and the circuits of which are governed by the aforesaid switches.

4. The combination with a motor, a mechanism operated thereby, a transformer, a master controlling switch and a switch operated by the motor, corresponding contact terminals of both switches being connected to points in the transformer winding, of a circuit-controlling switch for the motor, the operation of which is governed by the aforesaid switches.

5. The combination with a motor, a mechanism operated thereby, a transformer, a master controlling switch and a switch operated by the motor, corresponding contact terminals of both switches being connected to points in the transformer winding, of a circuit-controlling switch for the motor the closing of which is governed by the master switch and the opening of which is governed by the motor-operated switch.

6. The combination with a motor, a mechanism operated thereby, a transformer, a master controlling switch and a switch operated by the motor, corresponding contact terminals of both switches being connected to points in the transformer winding, of a circuit-controlling switch for the motor whereby the motor is caused to rotate in direction and extent in accordance with the direction and extent of movement of the master switch.

7. The combination with a motor, a mechanism operated thereby, a transformer, a master controlling switch and a switch operated by the motor, corresponding contact terminals of both switches being connected to points in the transformer winding, of a circuit-controlling switch for the motor whereby the motor is caused to move the switch member that is operated thereby into engagement with the contact terminal corresponding to the one with which the master switch arm engages.

8. The combination with a motor, a switch operated thereby and a master controlling switch, of a switch for governing the circuits of the motor having magnet windings the circuits of which are continuously established and other windings the circuits of which are governed by the aforesaid switches.

9. The combination with a motor, a switch operated thereby and a master switch, of a switch for governing the circuits of the motor comprising a movable member and actuating electro-magnets having windings connected to exert balanced magnetic pulls upon said member, and windings governed by the master switch and the motor-operated switch to coöperate with the first named windings in exerting unbalanced magnetic pulls upon said member.

10. The combination with a motor, a master controller, and a regulator operated by the motor, each of which comprises a set of conducting segments that are supplied with variable voltages, of a circuit-controlling switch for the motor whereby the motor is caused to operate in a direction and extent in accordance with the direction and extent of movement of the master controller.

11. The combination with a motor, a master controller, and a motor-operated regulator which comprises a set of conducting segments that are supplied with different voltages, of a circuit-controlling switch for the motor whereby the regulator operated thereby is caused to occupy a position corresponding to that of the master controller.

12. The combination with a motor and two sets of contact terminals to which corresponding variable voltages are supplied, respectively, of switch arms to engage the respective sets of terminals, one of which is operated by the motor in accordance with the direction and extent of manual movement of the other arm.

13. The combination with two sets of contact terminals to which corresponding variable voltages are supplied, respectively, of switch arms to engage the respective sets of terminals, and a motor for operating one of the arms whereby the arms are caused to engage contact terminals to which corresponding voltages are applied.

14. The combination with two sets of contact terminals to which corresponding variable voltages are supplied, respectively, of switch arms to engage the respective sets of terminals, and a motor whereby one of the arms is operated in accordance with the direction and extent of movement of the other.

15. The combination with two sets of contact terminals to which corresponding variable voltages are supplied, respectively, of switch arms to engage the respective sets of terminals and a motor whereby one of the arms is caused to occupy positions corresponding to those of the other.

16. The combination with a voltage regulator comprising a set of conducting segments to which variable voltages are applied and a movable terminal that engages therewith, of a switch comprising a set of conducting segments to which variable voltages are applied, an arm to engage therewith, a motor for causing operation of the movable terminal of the regulator in proportion to the extent of movement of the switch-arm, and means for governing the direction of rotation of the motor.

17. The combination with a voltage regulator comprising a set of circuit terminals that are supplied with different voltages and a movable terminal that is adapted to engage therewith, of a motor for governing the position of the movable terminal, means for governing the direction of rotation of the motor and a switch for governing the extent of movement of the movable terminal.

18. The combination with a voltage regulator comprising a set of conducting segments to which variable voltages are applied and a movable terminal that engages therewith, of a switch comprising a set of conducting segments to which variable voltages are applied, an arm to engage therewith, and a motor for causing operation of the movable terminal of the regulator when the said able terminal and switch-arm occupy non-corresponding positions with reference to the respective sets of conducting segments.

19. The combination with a voltage regulator comprising a set of conducting segments to which variable voltages are applied and a movable terminal that engages therewith, of a switch comprising a set of conducting segments to which variable voltages are applied, an arm to engage therewith, and a motor that is connected between the movable terminal of the regulator and the switch-arm and to which a voltage is applied only when the movable terminal of the regulator and the switch-arm occupy non-corresponding positions with reference to the respective sets of conducting segments.

20. In a voltage regulator, the combination with a movable circuit-terminal, of an electro-magnetic actuator therefor and means for supplying the actuator with a voltage that corresponds to the difference of potential between the actual position of the movable terminal and the prospective position thereof.

21. In a voltage regulator, the combination with an actuator for the movable member, of means for supplying a voltage to the actuator that shall correspond to the difference of potential between the existing position of the movable member and the prospective position thereof.

In testimony whereof, I have hereunto subscribed my name this 5th day of May, 1905

RAY P. JACKSON.

Witnesses:
R. WIKANDER,
BIRNEY HINES.